(12) United States Patent  (10) Patent No.: US 7,761,511 B2
Kaplan  (45) Date of Patent: Jul. 20, 2010

(54) SYSTEM AND METHOD FOR OPTIMAL SHORT MESSAGE SERVICE (SMS) ENCODING IN A WIRELESS COMMUNICATIONS DEVICE

(75) Inventor: Diego Kaplan, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 2085 days.

(21) Appl. No.: 10/091,311

(22) Filed: Mar. 4, 2002

(65) Prior Publication Data
US 2003/0167306 A1  Sep. 4, 2003

(51) Int. Cl.
*G06F 15/16* (2006.01)
(52) U.S. Cl. .................. 709/205; 709/206; 709/246; 370/271; 370/260; 379/88.17
(58) Field of Classification Search ......... 709/205–206, 709/246; 379/88.17; 370/271, 260
See application file for complete search history.

(56) References Cited

U.S. PATENT DOCUMENTS

| | | | | |
|---|---|---|---|---|
| 5,249,220 A | * | 9/1993 | Moskowitz et al. | 379/93.19 |
| 5,347,268 A | * | 9/1994 | Nelson et al. | 340/7.43 |
| 5,729,610 A | * | 3/1998 | Ishida | 380/271 |
| 5,844,922 A | * | 12/1998 | Wolf et al. | 714/786 |
| 5,859,594 A | * | 1/1999 | King et al. | 340/7.55 |
| 5,959,543 A | * | 9/1999 | LaPorta et al. | 340/7.23 |
| 6,539,118 B1 | * | 3/2003 | Murray et al. | 382/229 |
| 6,590,887 B1 | * | 7/2003 | Lee | 370/342 |
| 6,697,422 B1 | * | 2/2004 | Mathai | 375/222 |
| 6,745,024 B1 | * | 6/2004 | DeJaco et al. | 709/206 |
| 6,760,882 B1 | * | 7/2004 | Catreux et al. | 714/774 |

* cited by examiner

*Primary Examiner*—Thu Nguyen
*Assistant Examiner*—Lan-Dai T Truong

(57) ABSTRACT

A system and a method are provided for optimal Short Message System (SMS) encoding in a wireless communications device having SMS capabilities. The system includes an optimizing subsystem and an encoding subsystem. The optimizing subsystem accepts an SMS message, identification of available encoding formats, and information regarding wireless device resource encoding requirements, such as memory usage, for the available encoding formats. The optimizing subsystem evaluates the characters in the SMS message to identify which of the available encoding formats are usable for encoding the characters, determines a memory usage requirement, and selects, as the optimal encoding format, the usable encoding format having the lowest memory usage. The optimizing subsystem supplies an optimizing signal identifying the optimal encoding format. The encoding subsystem accepts the SMS message and the optimizing signal, and encodes the message in the optimal encoding format. The encoding subsystem supplies the encoded SMS message to a wireless device memory circuit. The memory circuit supplies the stored SMS message for presentation on a user display or transmission by a transceiver.

20 Claims, 2 Drawing Sheets

SYSTEM AND METHOD FOR OPTIMAL SHORT MESSAGE SERVICE (SMS) ENCODING IN A WIRELESS COMMUNICATIONS DEVICE

BACKGROUND OF THE INVENTION

1. Field of the Invention

This invention generally relates to wireless communications telephony and, more particularly, to a system and method for selecting and implementing optimal Short Message Service (SMS) message encoding in a wireless communications device having SMS capabilities.

2. Description of the Related Art

SMS is a text message service that enables short messages of generally no more than 140-160 characters in length to be transmitted from, and received by a wireless communications device. SMS was introduced in the Global System for Mobile Communications system and now is supported by a majority of other digital-based mobile communications systems. Unlike paging, in an SMS system, messages are stored in and forwarded to SMS centers. SMS messages travel to wireless communications devices over the wireless communication coverage network control channel, which is separate and apart from the voice (traffic) channel.

SMS messages are encoded for transmission and receiving using encoding formats such as seven-bit ASCII, ISO Latin 1, or Unicode. Most standard wireless communications devices are equipped to receive SMS messages and can typically receive SMS messages in more than one format. However, some wireless devices can only receive SMS messages encoded in a single format, such as seven-bit ASCII. Mobile Origination (MO) is a feature of SMS that allows a wireless communications device user to generate and transmit SMS messages from their wireless device. The text character sets supported by the various encoding formats noted above vary in complexity. However, in general, the more complex the character set in an SMS message, the greater the memory usage required for encoding the message. Among the formats typically available for use in encoding SMS messages, seven-bit ASCII has the smallest memory footprint (uses the smallest amount of wireless device memory per text character). Seven-bit ASCII, as the name implies, uses seven bits in one byte to encode each text character and can be used to encode English language messages with a minimum of special characters. The ISO Latin 1 format uses eight bits in one byte to encode each character. ISO Latin 1 has a larger character set than seven-bit ASCII and can be used to encode some non-English language messages (for example, Spanish) and a larger number of special characters, as well as, English language messages. Due to the use of the eighth bit per character, ISO Latin 1 uses more memory per text character than seven-bit ASCII. Other formats use still more memory. Unicode, for example, uses two eight bit bytes per text character. Unicode, however, can be used to encode a larger number of special characters, as well as, a greater number of languages. Characters in an SMS message outside the range of the particular format used for the encoding are dropped from the message. For example, a "ñ" in a Spanish-language SMS message is dropped from the message (not encoded) if seven-bit ASCII is used to encode the message.

It is known to preset the encoding format for transmitting and receiving SMS messages in a wireless device at the factory. However, presetting the format can result in incompatibilities between wireless devices and/or restrictions in the encoding formats usable by wireless devices. For example, a wireless device preset with seven-bit ASCII is compatible with other wireless devices transmitting English-language SMS messages, but the same wireless device is not compatible with other wireless devices transmitting foreign-language or special character messages encoded in ISO Latin 1. Therefore, it is known to preset wireless devices with seven-bit ASCII to ensure compatibility with other devices that may be formatted in seven-bit ASCII. Unfortunately, as described above, presetting a wireless device with seven-bit ASCII can create incompatibilities with devices preset to formats such as ISO Latin 1 and limits the preset device to English-language SMS messages.

Presetting the format also does not allow the wireless device to adapt to SMS messages and results in the use of encoding formats having an unnecessarily large memory requirement or the loss of message content. For example, a format preset for ISO Latin 1 uses one bit more memory per character to encode an English-language message than does seven-bit ASCII, but drops characters that are only supported by Unicode.

Increased memory usage for encoding an SMS message in a wireless device can create problems for at least three reasons. First, the total number of bits (memory usage) that can be included in an SMS message is limited. Therefore, using an encoding format that supports an unnecessarily large character set reduces the length of the SMS message that can be sent or received. For example, if an encoded SMS message is limited to 448 bits, a 64 character English language message (7 bits per character) can be sent in seven-bit ASCII, while only a 56 character English language message (eight bits per character) can be sent in ISO Latin 1.

Second, the greater the number of bits in an SMS message, the greater the bandwidth requirements. Typically, the result is a longer transmission time with subsequent increases in network time usage and increased costs for the wireless device user. Third, memory storage in a wireless device is limited by cost and available space, and increasing the memory usage associated with encoding an SMS message reduces the amount of memory storage available in the wireless device for other functions.

It would be advantageous if an SMS enabled wireless communications device could evaluate an SMS message, select an optimal encoding format having the lowest memory usage for encoding the message, and encode the SMS message in the optimal format.

SUMMARY OF THE INVENTION

The present invention addresses the problem of wireless communications device resource encoding requirements for a Short Message Service (SMS) enabled wireless device, in particular, the memory usage associated with encoding an SMS message in the wireless device. The invention addresses this problem by identifying the encoding formats available in the wireless device and capable of encoding the SMS message and selecting the encoding format with the smallest memory requirement as the optimal encoding format. The SMS message is then encoded using the optimal encoding format and stored in wireless device memory.

Accordingly, a system is provided for optimal SMS encoding in a wireless communications device having SMS capabilities. The system includes an optimizing subsystem and an encoding subsystem. The optimizing subsystem accepts an SMS message, identification of available encoding formats, and information regarding wireless device resource encoding requirements, such as memory usage, for the available encoding formats. The optimizing subsystem evaluates the characters in the SMS message to identify which of the available encoding formats are usable for encoding the characters, determines a memory usage requirement, and selects, as the optimal encoding format, the usable encoding format having the lowest memory usage. The optimizing subsystem has an output to supply an optimizing signal identifying the optimal encoding format.

The encoding subsystem accepts the SMS message and the optimizing signal, and encodes the message in the optimal encoding format. The encoding subsystem also has an output to supply the encoded SMS message to a wireless device memory circuit. The memory circuit supplies the stored SMS message for presentation on a user display or transmission by a transceiver.

The use of the present invention system enables an SMS enabled wireless device to identify the encoding formats available in the wireless device and usable for encoding an SMS message in the wireless device and enables the wireless device to encode the SMS message using the identified encoding format code with the smallest memory requirement.

Additional details of the above-mentioned system and a method for optimal SMS encoding in a wireless communications device having SMS capabilities are presented below.

DETAILED DESCRIPTION OF THE PREFERRED EMBODIMENTS

Figure 1:
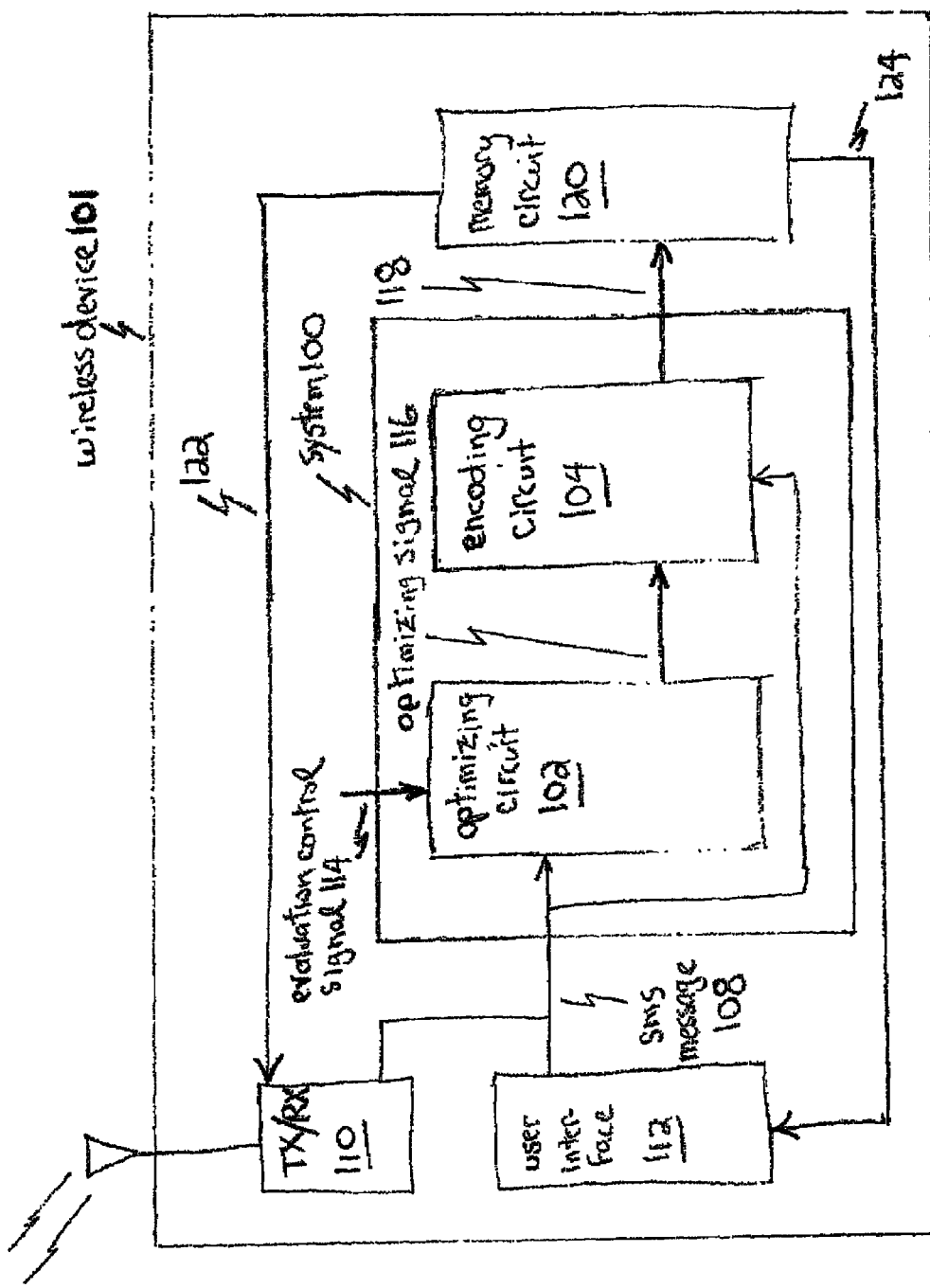
FIG. 1 is a schematic block diagram depicting one embodiment of the present invention system for optimal Short Message Service (SMS) encoding in a wireless communications device having SMS capabilities.

FIG. 1 is a schematic block diagram depicting one embodiment of the present invention system 100 for optimal Short Message Service (SMS) encoding in a wireless communications device having SMS capabilities. FIG. 1 represents one solution for implementing the present invention system. However, the present invention system is not limited to this particular implementation. The system 100 includes an optimizing subsystem and an encoding subsystem in a wireless device 101. The optimizing subsystem and the encoding subsystem are depicted in FIG. 1 as an optimizing circuit 102 and an encoding circuit 104 respectively, for illustration purposes. It will be understood by one of skill in the art that the optimizing subsystem need not be a circuit and the encoding subsystem need not be a circuit. These subsystems can be implemented in software, hardware, or some combination of software and hardware. The optimizing circuit 102 has an input on line 108 to accept an SMS message from a transceiver 110. The SMS message received by transceiver 110 is encoded for transmission to the wireless device 101 by a device originating the message, for example, a base station (not shown). Wireless device 101 is Mobile Origination (MO) enabled and, therefore, wireless device 101 also can accept SMS messages from a user interface 112. The SMS message is encoded by the user interface. The user interface 112 can generate the SMS message in a variety of ways, including manually inputting on a keypad (not shown). It is assumed that an SMS message from either the transceiver 110 or the user interface 112 is encoded in one of the formats available in the wireless device 101. The optimizing circuit 102 also has an input on line 114 to accept an evaluation control signal and an output on line 116 to supply an optimizing signal in response to wireless device 101 encoding requirements for the SMS message.

The evaluation control signal identifies formats available in the wireless device 101 for encoding the SMS message, such as seven-bit ASCII, ISO Latin 1, and Unicode. The following discussion assumes these three encoding formats are available in wireless device 101. The evaluation control signal also includes parameters associated with the available formats, including character sets supported by the formats and the number of bits needed to encode a single character. The option of choosing from among a set of available encoding formats can minimize the incompatibilities between wireless devices and/or restrictions in the encoding formats usable by wireless devices as described in the Background. For example, the system 100 allows the wireless device 101 to be compatible with wireless devices transmitting SMS messages encoded in seven-bit ASCII, as well as ISO Latin 1 and Unicode. The system 100 also allows the wireless device 101 to transmit SMS messages encoded in seven-bit ASCII (for example, English-language messages) to wireless devices preset with seven-bit ASCII, while still allowing the wireless device 101 to transmit SMS messages encoded in ISO Latin 1 and Unicode (for example, foreign-language and special character messages) to devices preset with ISO Latin 1 and Unicode.

The optimizing circuit 102 evaluates the SMS message to identify which of the available formats are usable for supporting the characters in the message. The various encoding formats are able to support different size character sets depending on the amount of memory that the respective formats use to encode a single character as described above. The optimizing circuit 102 determines a memory usage requirement for each of the formats usable for encoding the SMS message. The memory usage requirement can be a measure of the total memory usage required to encode the SMS message in the respective format or the memory usage required to encode a character in the respective format.

After identifying the available formats usable for supporting the SMS message and determining the memory usage requirements, the optimizing circuit 102 selects the optimal encoding format. The optimal encoding format is the usable format that minimizes memory usage in the wireless device 101. Therefore, the optimizing circuit 102 selects as the optimal encoding format, the format usable for supporting the SMS message and having the minimum memory usage requirement. The optimizing circuit 102 has an output to supply the optimizing signal identifying the optimal encoding format.

The reduction of memory usage in wireless device 101 has at least three benefits. First, a longer SMS message (more characters) can be sent using a format having a smaller memory usage requirement per character, while still supporting the language and special character content of the message, since the total number of bits that can be included in an SMS message is limited. For example, if an encoded SMS message is limited to 448 bits, a 64 character English language message (7 bits per character) can be sent in seven-bit ASCII, while only a 56 character English language message (eight bits per character) can be sent in ISO Latin 1.

Second, using fewer bits in an SMS message reduces bandwidth requirements by reducing the transmission time or the use of transmission frequency spectrum. Third, more memory is made available in the wireless device 101 for other uses or it may be possible to reduce the amount of memory that is installed in the wireless device 101.

The encoding circuit 104 has an input on line 108 to accept the SMS message, an input on line 116 to accept the optimizing signal, and an output on line 118 to supply the SMS message encoded in the optimal encoding format. The encoding circuit 104 encodes the SMS message in the optimal encoding format upon receipt of the optimizing signal on line 116. In one aspect of the system, the encoding circuit 104 supplies the SMS message to the output on line 118, without modification, if the optimal encoding format is the same as the format in which the SMS message already is encoded.

The memory circuit 120 has an input on line 118 to accept the SMS message encoded in the optimal encoding format for storage. The memory circuit 120 has an output to supply the stored SMS message on line 122 and an output to supply the stored SMS message on line 124. The transceiver 110 has an input on line 122 to accept the stored SMS message for transmission. Typically, a stored SMS message accepted by the transceiver 110 on line 122 is originally inputted via the user interface 112.

The user interface 112 has an input to accept the stored message on line 124 for presentation. Typically, a stored SMS message presented on the user interface 112 is originally received by the transceiver 110. The SMS message is typically displayed as a text message on a user interface 112 screen (not shown). However, other presentation means, such as audio (not shown) are possible.

In one aspect of the system, seven-bit ASCII is set as the default optimal encoding format in the encoding circuit 104. Using a default optimal format may increase the speed at which the SMS message is supplied to the memory circuit 120 as follows. The encoding circuit 104 uses the default format to encode the SMS message while the optimizing circuit 102 is evaluating the message, rather than waiting to begin the encoding process after receipt of the optimization signal. Accordingly, the encoding circuit 104 supplies the encoded message to the memory circuit 120 immediately upon receipt of the optimizing signal, if no SMS message characters are detected outside the seven-bit ASCII character set.

Figure 2:
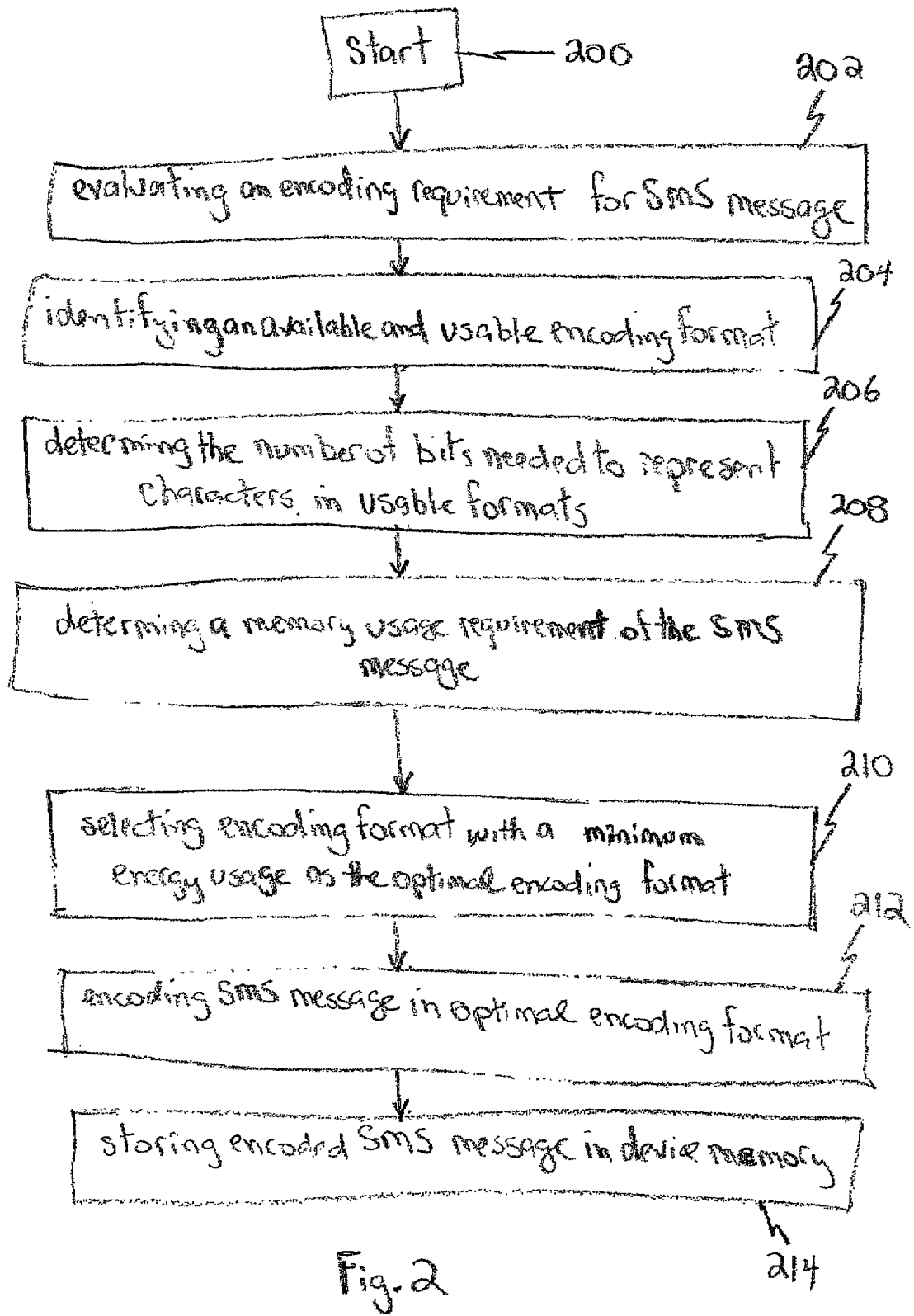
FIG. 2 is a flow chart illustrating one embodiment of the present invention method for optimal SMS encoding in a wireless communications device having SMS capabilities.

FIG. 2 is a flow chart illustrating one embodiment of the present invention method for optimal SMS encoding in a wireless communications device having SMS capabilities. The method starts at Step 200. Step 202 evaluates a wireless device resource encoding requirement for an SMS message in the wireless device. Step 204 identifies an encoding format available in the wireless device and usable for encoding the SMS message. Step 206 determines the number of bits needed to represent characters in the usable formats. Step 208 determines a memory usage requirement of the SMS message. Step 210 selects the encoding format that encodes the SMS message with a minimum memory usage as the optimal encoding format. Step 212 encodes the SMS message in response to selecting the optimal encoding format. Step 214 stores the encoded SMS message in wireless device memory.

In one aspect of the method, evaluating a wireless device resource encoding requirement for an SMS message in the wireless device in Step 202 includes evaluating an English-language SMS message. Identifying an encoding format available in the wireless device and usable for encoding the SMS message in Step 204 includes identifying seven-bit ASCII, ISO Latin 1, and Unicode formats as usable. Determining the number of bits needed to represent characters in the usable formats in Step 206 includes determining the number of bits needed to represent characters in the seven-bit ASCII, ISO Latin 1, and Unicode formats. Selecting the encoding format that encodes the SMS message with a minimum memory usage as the optimal encoding format in Step 210 includes selecting seven-bit ASCII.

In one aspect of the method, evaluating a wireless device resource encoding requirement for an SMS message in the wireless device in Step 202 includes inputting the SMS message to an MO enabled wireless device via a user interface and storing the encoded SMS message in wireless device memory in Step 214 includes transmitting the stored SMS message.

In another aspect of the method, evaluating a wireless device resource encoding requirement for an SMS message in the wireless device in Step 202 includes receiving the SMS message via a transceiver and storing the encoded SMS message in wireless device memory in Step 214 includes presenting the stored SMS message on a user interface.

In one aspect of the method, selecting the optimal encoding format in Step 210 includes selecting seven-bit ASCII as a default optimal encoding format. A system and a method are provided for optimal SMS encoding in a wireless communications device having SMS capabilities. Examples of the present invention have been enabled with seven-bit ASCII, ISO Latin 1, and Unicode encoding formats. However, it should be understood that the present invention is not limited to any particular encoding format. The present invention system and method are applicable to a wide range of devices that send and receive encoded messages including computers, lap top computers, personal digital assistants and wireless headsets. Other variations and embodiments of the present invention will occur to those skilled in the art.

I claim:

1. A system for optimal Short Message Service (SMS) character encoding in a wireless communications device having SMS capabilities, the system comprising:
    an optimizing subsystem with an input to accept an SMS message, an input to accept an evaluation control signal, and an output to supply an optimizing signal responsive to SMS message character encoding requirements prior to character encoding of the SMS message; and
    a character encoding subsystem with an input to accept the SMS message, an input to accept the optimizing signal, and an output to supply the SMS message in a character encoding format responsive to the optimizing signal.

2. The system of claim 1 wherein the evaluation control signal identifies character encoding formats available in the wireless communication device and available encoding format parameters including the number of bits needed to represent characters.

3. The system of claim 2 wherein the optimizing subsystem is configured to: evaluate the SMS message to identify the available character encoding formats usable for encoding the characters, determine a memory usage requirement select, as the optimal encoding format, a usable format with a minimum memory usage, and supply the identity of the optimal encoding format in the optimizing signal.

4. The system of claim 3 wherein the character encoding subsystem is configured to encode the SMS message in the optimal encoding format to generate an encoded SMS message and is further configured to supply the encoded SMS message at an output.

5. The system of claim 4 further comprising: a memory circuit having an input to accept the encoded SMS message for storage and having an output to supply the stored SMS message.

6. The system of claim 5 wherein the wireless device is Mobile Origination enabled and the optimizing subsystem accepts the SMS message from a user interface, the system further comprising:
    a transceiver having an input to accept the stored SMS message from the memory circuit for airlink transmission.

7. The system of claim 5 wherein the transceiver is configured to accept an airlink communication including an SMS message
and the optimizing subsystem is configured to accept the SMS message from the transceiver,
the system further comprising a user interface having an input to accept the stored SMS message for presentation.

8. The system of claim 5 wherein the character encoding subsystem uses seven-bit ASCII as a default optimal encoding format.

9. A method of encoding a Short Message Service (SMS) message, the method comprising:
encoding a SMS message using a SMS character encoding format to generate an encoded SMS message; and
prior to encoding the SMS message, selecting the SMS character encoding format based on a wireless device resource requirement of the encoded SMS message.

10. The method of claim 9, wherein the selecting comprises selecting the SMS character encoding format from a plurality of available encoding formats supported by a wireless communication device.

11. The method of claim 10, further comprising:
identifying the SMS character encoding format as usable for encoding the SMS message.

12. The method of claim 11 wherein identifying the SMS character encoding format as usable for encoding the SMS message comprises:
evaluating an English-language SMS message;
identifying seven-bit ASCII, IS0 Latin 1, and Unicode formats as usable;
determining a number of bits needed to represent characters in the seven-bit ASCII, IS0 Latin 1, and Unicode formats; and
selecting the seven-bit ASCII format as the SMS encoding format.

13. The method of claim 11, wherein the identifying the SMS character encoding format comprises determining a number of bits needed to represent characters in the available encoding format.

14. The method of claim 10, further comprising determining a memory usage requirement of the encoded SMS message.

15. The method of claim 10, wherein selecting the SMS character encoding format comprises selecting seven-bit ASCII as a default SMS character encoding format.

16. The method of claim 9, further comprising:
receiving the SMS message at a Mobile Origination enabled wireless device via a user interface; and
storing the SMS encoded message.

17. The method of claim 9, further comprising:
receiving the SMS message at a Mobile Origination enabled wireless device via a user interface; and
transmitting the encoded SMS message.

18. A Short Message Service (SMS) character encoding system configured to generate an encoded SMS message by encoding a SMS message using a SMS character encoding format and, prior to encoding the SMS message, selecting the SMS character encoding format based on a resource requirement of the encoded SMS message.

19. The SMS encoding system of claim 18, comprising:
a character encoding subsystem comprising an input for receiving a signal indicating the SMS character encoding format, the encoding subsystem configured to encode the SMS message in accordance with the signal; and
an optimizing subsystem configured to identify, prior to encoding of the SMS message, the SMS character encoding format from a plurality of SMS character encoding formats based on resources requirements corresponding to encoding the SMS message for each of the plurality of SMS character encoding formats, the optimizing subsystem comprising an output for generating the signal.

20. The SMS character encoding system of claim 19, wherein the resource requirement is an amount of memory required to store the encoded SMS message.

* * * * *